Patented Feb. 8, 1927.

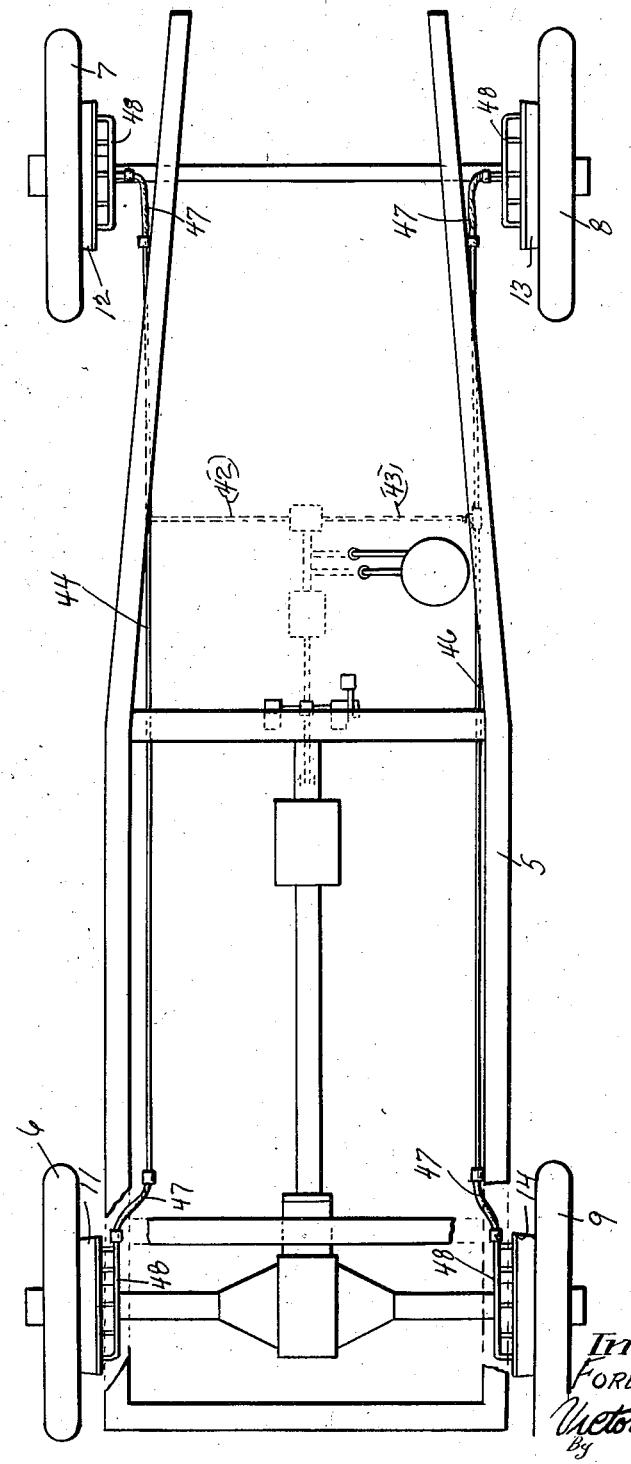

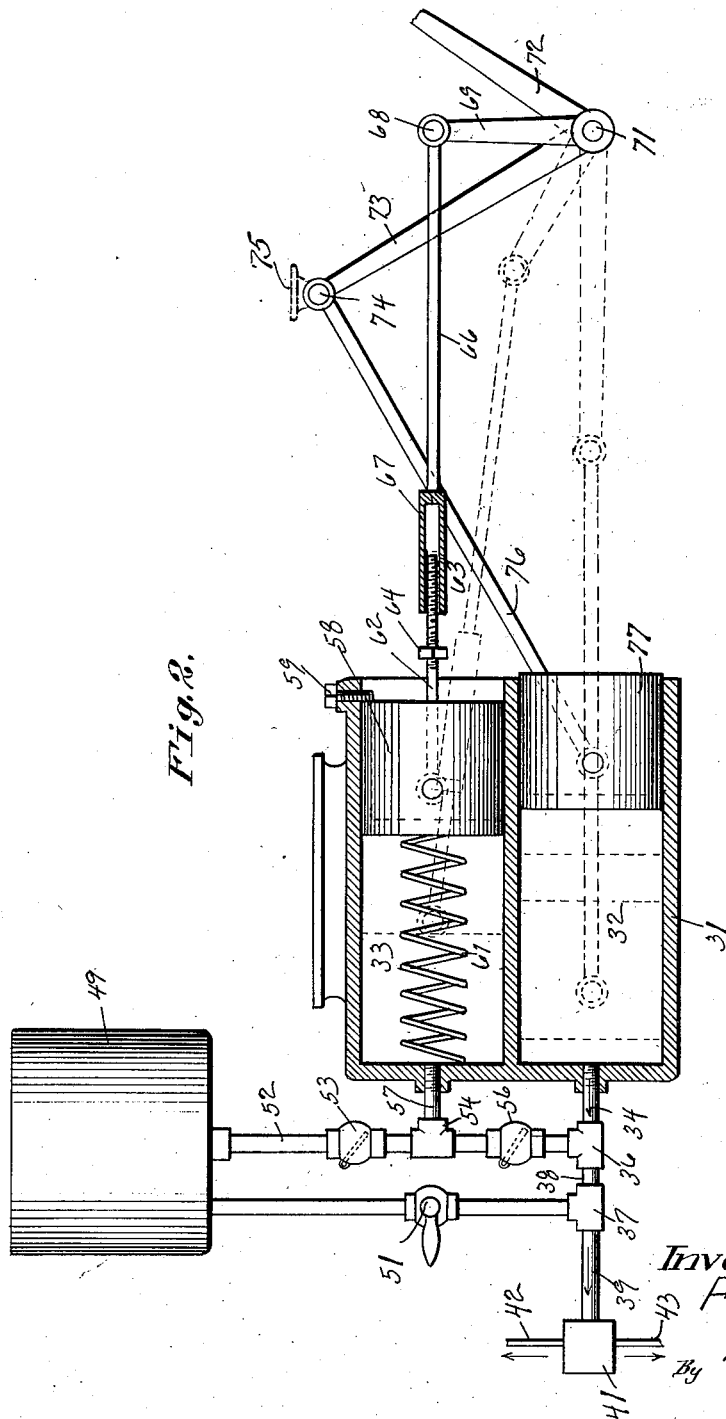

1,617,275

UNITED STATES PATENT OFFICE.

FOREST M. SARFF, OF LOS ANGELES, CALIFORNIA.

CONSTANT SUPPLY FOR FLUID BRAKING SYSTEMS.

Application filed January 24, 1925. Serial No. 4,545.

This invention relates to improvements in brakes, and has particular reference to a constant fluid supply system.

One object is to produce a device of this character which is simple in construction and one which may be applied to any automobile now upon the market.

Other objects and advantages will be apparent during the course of the following description.

In the accompanying drawings forming a part of this specification and in which like numerals are employed to designate like parts throughout the same, Figure 1 is a top plan view of an automobile chassis showing my invention applied thereto, Figure 2 is an enlarged detail view showing the pumping mechanism.

In employing hydraulic brakes, it is necessary to provide means for increasing the amount of fluid being used in the system in order to compensate for the wear of the brake linings and in order to accomplish this without the necessity of the driver pumping additional fluid into the system, I have devised a means which will automatically increase the fluid when the conditions demand an increase.

In the accompanying drawings wherein for the purpose of illustration is shown a preferred embodiment of my invention, the numeral 5 designates the chassis of a vehicle, the numerals 6, 7, 8 and 9 the wheels thereof, to which wheels are connected brake drums 11, 12, 13 and 14, respectively. The brakes as shown in Figure 1 may be of the usual piston and cylinder spring retracted hydraulic type.

Referring to Figure 2, the numeral 31 designates a casting having cylinders 32 and 33 formed therein. A pipe 34 connects with a T 36 which T is in turn connected to a second T 37 by a nipple 38. The second T is connected by a pipe 39 to an equalizing chamber 41 in which equalizing chamber, pipes 42 and 43 extend to horizontal pipes 44 and 46 extending parallel to the chassis and connected by flexible connections 47 to distributing rings 48. These distributing rings are in turn connected to the cylinders of the respective brakes.

Again referring to Figure 2 it will be noted that the numeral 49 refers to a storage tank connected through a valve 51 to the T 37. The tank 49 is also connected to a pipe 52 to a check valve 53 thence to a T 54, check valve 56 to T 36. A nipple 57 connects the T 54 with the cylinder 33. Within this cylinder 33 is mounted a piston 58 which is held therein by a bolt 59 which extends into the path of its movement. This piston is normally maintained against this bolt by a spring 61 bearing against the head of the cylinder.

At 62, I have shown a connecting rod secured to the cylinder 58, and carrying a threaded extremity 63 upon which a nut 64 is secured.

A sliding link 66 has formed on one end a socketed member 67 having a plain bore telescoping the threaded end 63 of the connecting rod 62. The other end of this link is pivoted at 68 to a lever 69 which is rigidly secured to the shaft 71 upon which the customary brake pedal lever 72 is attached. A lever 73 is also secured to this shaft 71 and has pivoted to its free end as at 74, a connecting rod 76 which is attached to a piston 77 slidable within the cylinder 32. A stop 75 is providel on the under portion of the car to limit the upward movement of the rod 76 and is arranged in the path of the pivot thereof with the lever 73, as clearly shown in Figure 2 of the drawings.

The operation of my device is as follows:—

Assuming that my device has been applied to an automobile as shown in Figure 1, pressure upon the brake pedal will cause the brake lever 72 to move toward the left of the drawing which will rock the shaft 71. This will in turn cause the lever 73 to move toward its dotted line position of Figure 2 with the result that the piston 77 will move into the cylinder 32. This will cause the fluid within the cylinder to pass through the pipe 34, T 36, nipple 38, T 37, pipe 39 to equalizer 41, thence by pipes 42 and 43 to pipes 44 and 46 to equalizer rings 48, from which rings the fluid will enter the cylinders of the brakes.

During the exertion of this pressure the check valve 56 acts to prevent any fluid from passing upwardly therethrough and thus escape without accomplishing the result desired. The amount of movement of the brake lever 72 will in most instances result in a 30° movement, the same being sufficient to apply the brakes. During this amount of movement the link 66 merely telescopes the threaded end of the connecting link 62 and therefore does not impart motion to the piston 58.

After the brake linings of the brakes have become worn, the amount of fluid necessary to set the brakes will cause the brake pedal to move through an arc of more than 30° with the result that the end of the link 66 will contact the nut 64 and then further movement of the brake pedal will cause the piston 58 to move in its cylinder against the tension of the spring 61, with the result that the fluid confined in this cylinder will be exhausted through the nipple 57, T 54, check valve 56 and into the T 36, where it will join the fluid passing from the cylinder 32.

When the pressure is removed from the brake pedal, the springs in the brakes will return this fluid to the cylinder 32. At the same time the piston 58 in returning to its normal position will draw fresh fluid from the tank 49 through the pipe 52, check valve 53, T 54, nipple 57 into the cylinder 61, thus replenishing the amount of fluid which was expressed by this cylinder into the working fluid. When the brakes are released and it is necessary to return the excess fluid to the tank 49, the valve 51 is opened, which will permit the fluid to return to the tank.

It will thus be seen that I have provided a device which is simple in construction, applied to any make of automobile, and accomplishes the desired result.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described my invention, I claim:—

1. In a hydraulic braking system, a hydraulic brake, a pipe connected to said brake, for the purpose of delivering hydraulic pressure thereto, a cylinder, a piston adapted to be reciprocated in said cylinder, means for conducting fluid pressure from said cylinder to said pipe, a second cylinder positioned parallel to said first mentioned cylinder, a piston adapted to be reciprocated in said second mentioned cylinder, a connecting rod secured to said second mentioned cylinder, a sliding link having one end telescoping said connecting rod, and means for reciprocating said sliding link and said first mentioned piston simultaneously.

2. In a device of the character described, a cylinder, a piston positioned within said cylinder and adapted to be reciprocated therein, a connecting rod secured to said piston, a lever secured to said connecting rod, a brake lever adapted to actuate said lever, a second lever adapted to be actuated by said brake lever, a sliding link secured to said second mentioned lever, a second cylinder positioned parallel to said first mentioned cylinder, a piston adapted to reciprocate therein, a connecting rod connected to said last mentioned piston, said piston rod and said sliding link having a telescopic connection, a pipe adapted to conduct fluid from each of said cylinders to a remote point, and a check valve positioned in said pipe at a point between said cylinders for the purpose of preventing the flow of fluid from said first mentioned cylinder to said second mentioned cylinder.

In testimony whereof I affix my signature.

FOREST M. SARFF.